July 12, 1949.

B. P. KUNZ 2,475,789

METHOD AND MACHINE FOR MAKING
CORRUGATED STRUCTURES

Filed June 25, 1946

INVENTOR.
BERNARD P. KUNZ
BY
P. N. Lamphere
ATTORNEY

INVENTOR.
BERNARD P. KUNZ
BY
P. H. Lamphere
ATTORNEY

July 12, 1949.

B. P. KUNZ 2,475,789

METHOD AND MACHINE FOR MAKING
CORRUGATED STRUCTURES

Filed June 25, 1946

INVENTOR.
BERNARD P. KUNZ
BY
P. H. Lamphere
ATTORNEY

Patented July 12, 1949

2,475,789

UNITED STATES PATENT OFFICE 2,475,789

METHOD AND MACHINE FOR MAKING CORRUGATED STRUCTURES

Bernard P. Kunz, Denver, Colo.

Application June 25, 1946, Serial No. 679,181

19 Claims. (Cl. 154—32)

This invention relates to an improved method for making a corrugated structure and a machine for carrying out said method.

An object of the invention is to provide an improved method of making a corrugated structure in the form of a panel.

A further object of the invention is to provide an improved method of making from a corrugated sheet or sheets of material a corrugated structure in which the axes of the corrugations are positioned at right angles to the major faces.

Another object is to provide an improved method involving a continuous operation for making from a sheet of corrugated material having the axes of its corrugations parallel to the major surfaces of the sheet, a corrugated panel structure embodying strips from said sheet in which the axes of the corrugations of the strips are arranged in the panel so as to be at right angles to the major surfaces of the said panel.

Still a further object is to produce a method of continuously making a corrugated structure embodying strips of corrugated material cut from a continuously moving sheet of such material and secured together so that the edges of the strips form the major surfaces of the structure and then severing the structure during its continuous movement to provide rectangular panels.

Still another object is to provide a machine that will, by continuous operation, produce from a sheet or sheets of corrugated material having the axes of the corrugations parallel to the major surfaces of each sheet, rectangular panel structures in which the axes of the corrugations are at right angles to major surfaces of each resulting panel.

Yet a further object is to provide a continuously operating machine that will so act on a sheet of continuously fed corrugated material as to cause it to be cut into strips, place the strips on edge, adhere the strips together in parallel relation to form a continuous sheet of corrugated structure in which the axes of the corrugations are at right angles to the major axes of the structure and automatically sever from said structure panels of like dimensions.

A more specific object is to provide a machine which will change a continuously fed sheet of corrugated paper provided with a flat sheet of paper on at least one side thereof into panels of like dimensions, each of which has the axes of its corrugations at right angles to the major flat surfaces of the panel.

Another object is to provide in a machine for producing a continuously moving structure an improved automatically controlled saw for severing from the outgoing end portion of said structure sections of like length without the necessity of stopping the movement of the structure or varying its rate of movement through or from the machine.

Yet another object is to produce a saw which will sever a continuous structure moving at a predetermined rate of speed and produce a severing line which is at right angles to the line of movement of the structure.

A further object is to produce a saw of the kind above referred to which will be automatically operable and so controlled as to successively cut the continuously moving structure by moving alternately from one side of the structure to the other.

Other objects of my invention will become apparent from the following description taken in connection with the accompanying drawings showing a machine capable of carrying out the steps of the improved method, all of which embodies the invention.

In the drawings:

Figure 12 is a sectional view taken on the line

12—12 of Figure 8 showing additional details of the panel remover;

Figures 1, 2, 3:
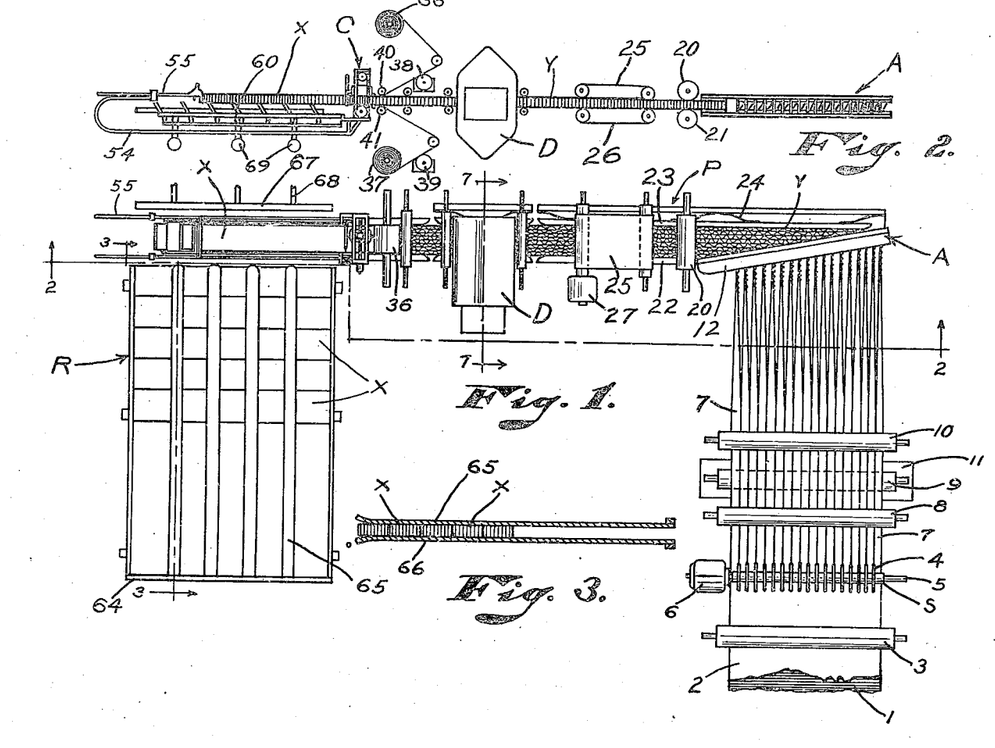
Figure 1 is a schematic top view of a machine for making the corrugated structure.
Figure 2 is a side view of part of the machine shown in Figure 1, said view being taken as indicated by the line 2—2 of Figure 1.
Figure 3 is a side view of another part of the machine shown in Figure 1, said view being taken as indicated by line 3—3 of Figure 1.

Referring first to Figure 1, which is a schematic top view of a machine embodying my invention, the material which is to be converted by the operation of the machine is shown as comprising a sheet of corrugated paper, although the machine can convert sheets of other types of material by slight changes in its construction. The corrugated paper which is to be passed through the machine may come directly from a corrugating machine or from any suitable roll which may be mounted upon a proper spindle. The corrugated paper shown in the drawings is of the single faced type comprising a single sheet of corrugated paper 1 having adhered to the crowns on one side thereof a plain sheet of material 2. The corrugated paper strip entering the machine passes under a roller 3 and into a saw S which comprises a plurality of cutting elements 4 mounted on a cross shaft 5 and constantly driven by any suitable means such as the electric motor 6. The saw elements are equally spaced apart on the shaft and thus when the saw acts upon the strip of corrugated paper, said paper will be severed into a plurality of narrower strips 7, each being of a width equal to the space between the saw elements.

The narrow strips 7 of the corrugated paper then pass under a roller 8, over an adhesive roller 9 and under a roller 10. The corrugated paper, as it is fed to the machine, is arranged so that the plain side of the paper is on top and thus when the strips pass over the top of the adhesive roller, adhesive will be applied to the exposed crowns of the corrugated side. The roller 9 picks up adhesive from the vat 11 in which the roller is partially positioned.

Figures 4, 5, 6:
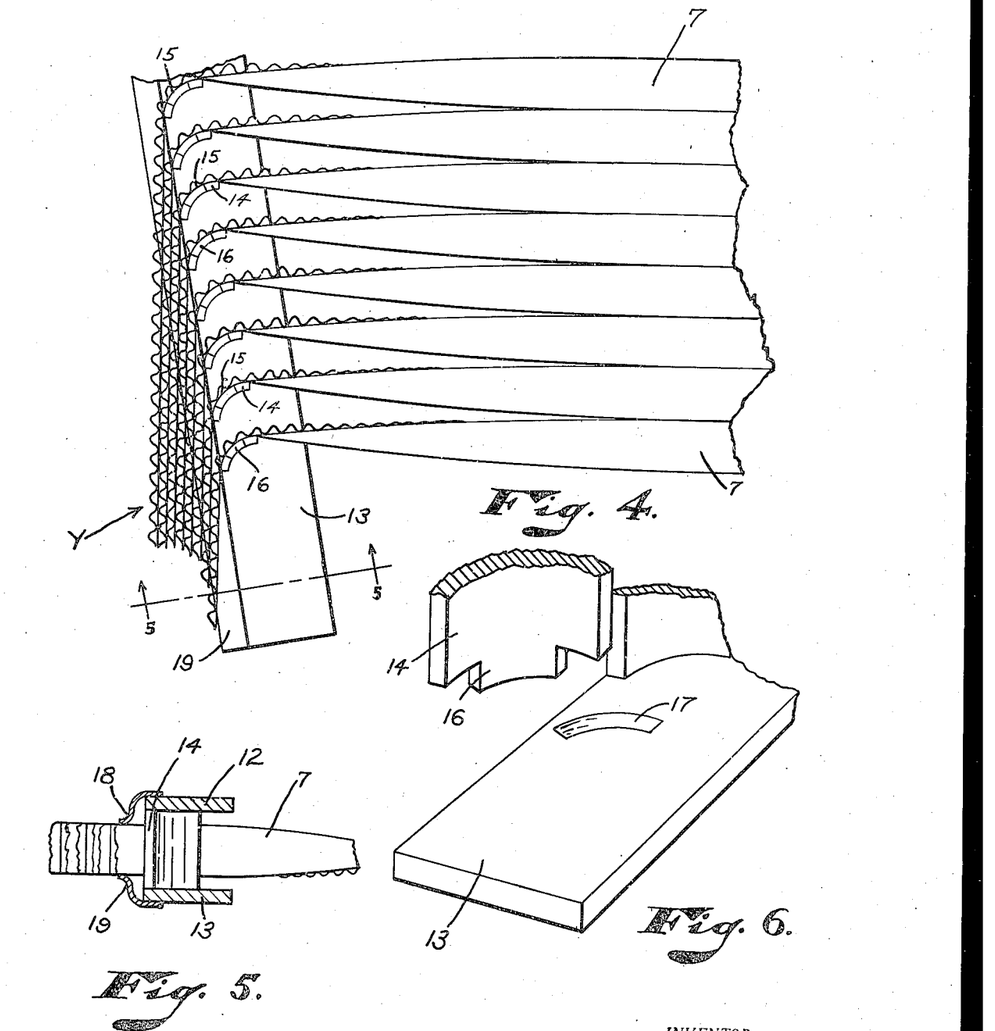
Figure 4 is an enlarged top view of a portion of the strip turning guides with the upper holding plate removed.
Figure 5 is a section view taken on the line 5—5 of Figure 4 showing further details of the turning guides.
Figure 6 is a perspective view showing the manner of attaching the turning guides to the holding plates.

After the corrugated sheet of paper is cut into the narrower strips 7 and adhesive is applied to the exposed crown portions of the strips, the strips are arranged to pass through a guide assembly A which is best shown in Figures 4, 5 and 6. This guide assembly is formed with upper and lower horizontally positioned guide support plates 12 and 13, between which are mounted a plurality of vertical guide elements 14. These guide elements are formed in the shape of sections of a cylinder so as to provide outer curved surfaces 15. The guides are held in their vertical positions by the support plates 12 and 13 and the structure employed to form the holding means comprises lugs 16 at the top and bottom of the guide elements which are arranged to fit into slots 17 in the upper and lower plates. The projection and slot arrangement is best shown in Figure 6. The guide assembly is also provided with upper and lower wiping and guiding bars 18 and 19.

By means of the guide assembly A the strips 7 are turned on edge, that is, given a turning movement of 90 degrees from the horizontal position in which they were positioned after coming from the saw and the adhesive roller. The guide elements not only are employed to turn the strips on edge, but to also permit a changing of direction of the movement of the strips after they have been turned on edge. This is well illustrated in Figure 4 wherein each guide element causees a strip to be turned on edge and also has its direction of movement changed by approximately 90 degrees. The guide assembly is so positioned that each successive guide element is spaced slightly ahead of the previous guide element when the guide assembly is viewed as shown in Figure 4. With such an arrangement the strips 7, as they leave the guides in a direction at substantially 90 degrees from the direction they approach the guides, will then be in close position with each other to thus form a structure wherein the axes of the corrugations are at right angles to the major surface of the structure formed by the edges of the strips. The guiding and wiping bars 18 and 19 insure that the corresponding edge surfaces of the strips will lie in a single plane and if any adhesive should have a tendency to drip off from the crowns of the corrugations of the strips, this excess adhesive will be wiped off by the bars.

Referring again to Figures 1 and 2, the plurality of strips 7, which will be referred to as the corrugated structure Y, after leaving the guides in close position pass between a pair of rollers 20 and 21 which form part of a press generally indicated by the letter P. These rollers insure that the corresponding edges of all the strips lie in the same plane if they have not already been so placed by the guiding and wiping bars. In addition to the rollers, the press also includes a fixed guide plate 22 and a movable guide plate 23 which are arranged to be adjacent the two outer strips of the structure Y as the structure comes from the guide assembly A. The movable guide plate 23 is backed by a plurality of leaf springs 24 which act to press this guide plate inwardly toward the opposite stationary guide plate 22. With the plurality of strips moving between the guide plates it is seen that the spring backed plate 23 will tend to compress the strips into close engagement so that the adhesive on the crowns of the corrugations of one strip will adhere these crowns to the smooth surface of the adjacent strip. The springs which act on the guide plate 23 are very light so that the pressure acting on the strips will not be great enough to cause any crushing of the corrugated paper. The adhesive which has been applied to the strips will begin to set as soon as the strips enter the press P. The structure Y, while passing between the guide plates 22 and 23, is arranged to pass between two endless belt structures 25 and 26 which are connected together to be driven at the same rate of speed by an electric motor 27 in order to pull the structure on through the machine.

Figure 7:
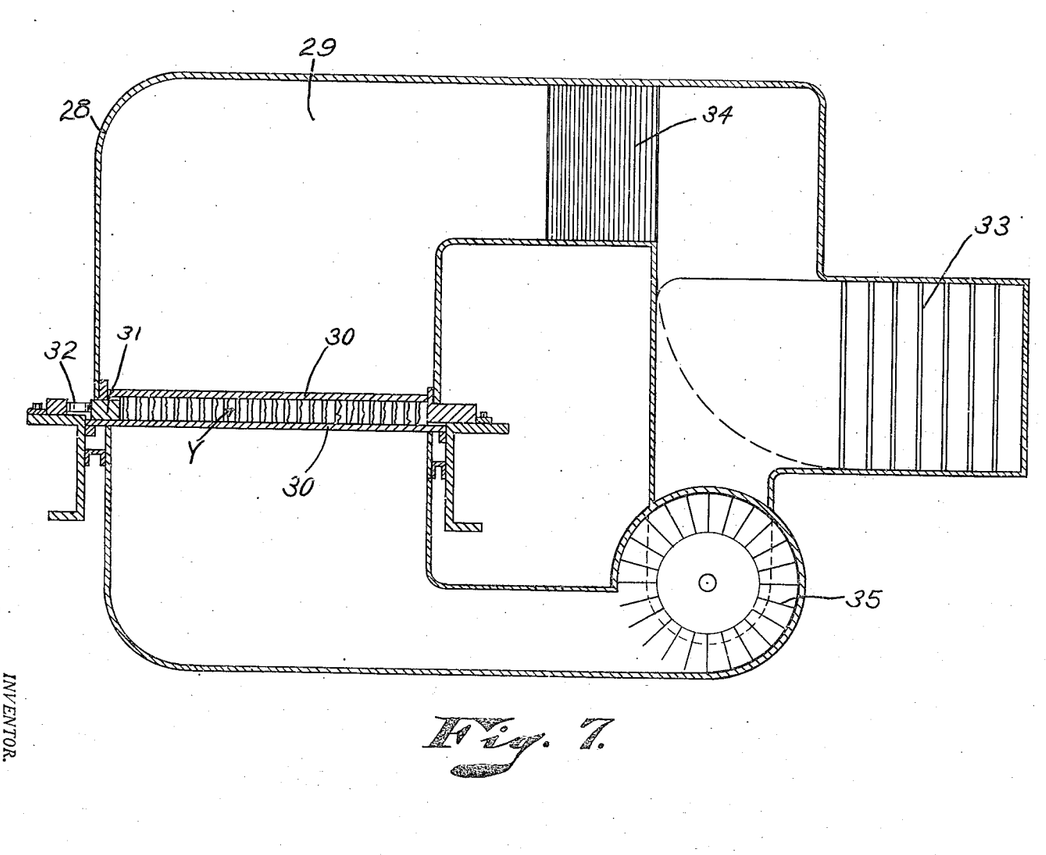
Figure 7 is a cross sectional view taken on the line 7—7 of Figure 1, showing details of the drying unit of the machine.

After the corrugated structure Y leaves the press P it is caused to pass through a drying and dehydrating unit D which is best shown in detail in the somewhat schematic detail view of Figure 7. This unit comprises a casing 28 which is so shaped as to provide an endless conduit 29 across which the corrugated structure Y passes. In order that the structure may properly pass across the conduit there is provided a guide arrangement 30 extending across the conduit which has associated with it a guide plate 31 backed by a leaf spring 32 for applying a slight edgewise pressure on the structure as it passes through the guide. Associated with the conduit is a heat exchanger 33 and also a condensing unit 34. There is also provided in the conduit a blower 35 driven by a motor (not shown). The arrangement of the heat exchanger, the condensing unit and the blower is such that the blower will pull air through the heat exchanger where its temperature is caused to be increased and thus force the heated air through the conduit and up through the material which is passing through the guide 30. Since the material is open, due to the vertically arranged corrugations, this heated air will cause a quick drying of the adhesive. After the heated air has passed through the material and withdrawn moisture from the adhesive, the air will be caused to pass through the condensing chamber which is maintained, by cooling, at considerably lower temperature than the air. As a result, the temperature of the air will drop and the moisture therein will be extracted if the moisture content is such that the air at the lowered temperature is super-saturated. After the air is cooled and the moisture extracted therefrom, it will again pass through the heat exchanger and from there be forced back through the material passing through the conduit, the heat exchanger causing the temperature to again be increased.

The corrugated structure Y, after it leaves the dryer and dehydrator, will then have applied to its major surfaces sheets of paper which are fed onto the top and bottom major surfaces of the structure from rolls 36 and 37, best shown in Figure 2. Adhesive will be applied to the one side of the paper as the paper leaves their rolls by suitable adhesive rolls indicated at 38 and 39. The paper is then adhered to the major surfaces of the corrugated structure by means of pressing rolls 40 and 41. If only one surface of the structure is desired to have paper applied thereto, then one roll 36 or 37 is eliminated as desired.

After the corrugated structure Y has been surfaced by paper, it will then be cut into any desired lengths by a cross-cut saw generally indicated by the letter C. The saw and associated structure is best shown in Figures 8, 9, 10, 11 and 12. The saw is supported upon a suitable fixed frame 42. On this frame is a movable saw carriage 43 which is arranged for reciprocable longitudinal movement on the frame, that is, a movement in the direction of the movement of the corrugated structure Y. The carriage is moved back and forth on the frame by means of an electric motor 44 which has on its end a driving gear 45 arranged to mesh with a rack 46 on the support. The motor 44 is of the reversible type so that when it is driven in one direction it can assist moving the saw carriage forwardly and when moved in the opposite direction it can move the saw carriage backwardly.

The saw carriage supports a motor 47 which is mounted in suitable guides to permit it to be moved crosswise of the carriage and to accomplish this movement there is secured to the top of the casing of the motor 47 a nut 48 threaded onto a screw 49 journaled at opposite sides of the carriage. This screw is arranged to be driven by an electric motor 50 which is also of the reversible type. With this arrangement it is seen that when the motor 50 is rotated in one direction it will so turn the screw that the motor 47 can be moved from one side of the carriage to the opposite side of the carriage, and when it is rotated in the opposite direction the motor 47 will be moved back to the first mentioned side. The motor 47 has connected to the front end of its rotor shaft a circular saw element 51. The corrugated structure Y, which has had the paper facing applied to both of its major surfaces, is arranged to pass through the carriage underneath the saw motor 47 and is suitably guided by top and bottom rollers 52 and 53 mounted on the carriage.

Figure 9:
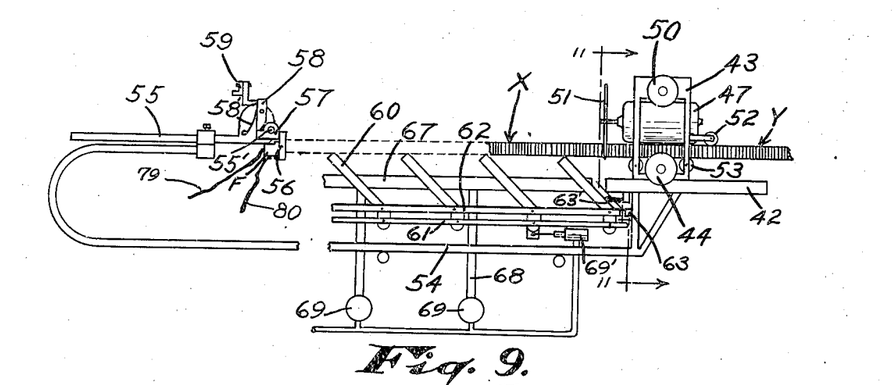
Figure 9 is a side of the structure shown in Figure 8.

During the cross-cutting of the corrugated structure by the saw, which is accomplished by the movement of the motor from one side of the carriage to the other, it is necessary that the motor 47 and the saw travel with the corrugated structure in order to produce a cut through the structure which will be at right angles to its edges. The movement of the corrugated structure is arranged to be transferred to the carriage and thus control the movement of the carriage so both will move in unison. In order to prevent any buckling of the moving structure the motor 44, as already mentioned, comes into operation to assist the carriage movement. As best shown in Figure 9 the carrier for the motor 47 of the saw is provided with two similar forwardly extending arms 54, each of which has a U-shaped end on which is mounted an adjustable member 55. The forward ends of the members 55 are interconnected by a cross rod 55' on which is pivotally mounted a cross bar 56 positioned to be in the same plane as that of the moving corrugated structure. The bar is provided at its end with brackets 57 by which it is pivoted on the rod. Associated with one of these brackets is a trigger 58 for holding the bar from rearward pivotal movement. The trigger is normally held in locking position with the bracket 57 by a leaf spring 58'. The trigger is arranged to engage a stop 59 carried by a suitable fixed part of the frame of the machine. The stop is so positioned that when the panel, which is indicated as X, is cut off from the moving corrugated structure and the carriage has reached the end of its travel, the trigger will be tripped so that the bar 56 is free to swing. This will permit freeing of the cut panel X and allow it to drop out of the line of the moving corrugated structure so that the uncut corrugated structure can continue to move forwardly without jamming. After the panel X is allowed to drop, the bar 56 will be forced back to its original position and the trigger will become locked under the action of the leaf spring 58'. The bar is moved back to its original locked position by the construction of the trigger, it being noted that this trigger is formed with a cam surface whereby under the action of the leaf spring 58' it can push the bar back to its position shown in Figure 9.

In order that the motor 44 may be properly controlled when assisting in moving the carriage forwardly, this motor has a circuit which has as one of its controls a switch F mounted at the center of the cross bar 56 and arranged to be closed when the end of the corrugated structure engages the bar 56 to move the carriage therewith. The switch F is shown in detail in Figure 14 and its construction will be later described, together with the circuit of the motor 44 which it controls. For the purpose of the description of the machine at this point, it need only be mentioned that the switch F is closed and the motor 44 operated to assist in moving the carriage whenever the end of the moving corrugated structure engages the bar 56 and by means of the bar transfers a force through the arms 54 to move the carriage and insure there will be movement in unison. After the panel is cut off and allowed to drop, the switch F will immediately become open.

Figure 8:
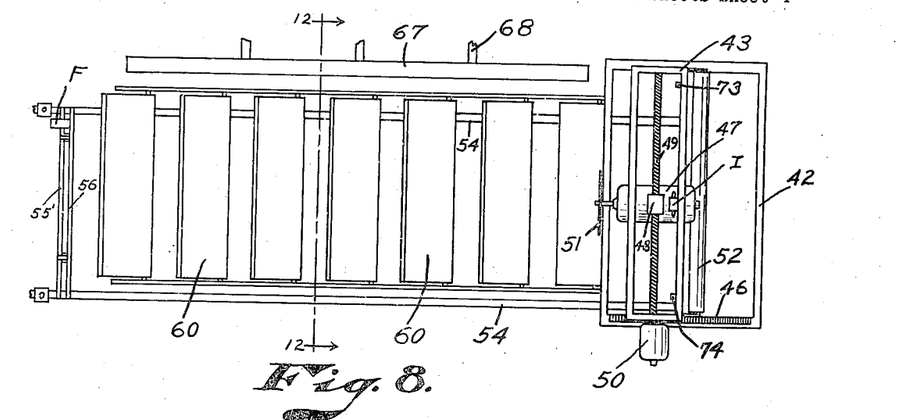
Figure 8 is an enlarged top view of the cut-off saw and panel remover.

The cut panel X of course must be immediately removed from the moving corrugated structure so that it will be out of the way to permit the moving corrugated structure to be free to continue its forward movement. This is properly controlled by means of a lowering bed which is best illustrated in Figures 8 and 9. The bed has a plurality of pivoted panels 60 of general L-shaped construction with their ends pivotally mounted to fixed bars 61. The panels are arranged to normally extend at an angle approximately 45 degrees with the vertical and in this normal position act to support the moving corrugated structure before and during the cross cutting. All of the panels are connected together for simultaneous forward movement by a rod 62 on one side of the panels. This rod 62 is arranged to be abutted by the portion of the carriage indicated at 63. The abutment of the rod 62 with the carriage occurs just prior to the carriage reaching the full forward end of its travel. When this occurs the panels 60 will be forced to be swung forwardly and downwardly about their pivoted lower ends. The movement of panels 60 will only be sufficient to place their top edges below the corrugated structure a slightly greater distance than the thickness of said structure. The panel X will be finished being cut off by the saw and will be freed at such time by the trigger release so as to drop onto the top edges of panels 60 and by its weight these panels will be swung downwardly to their fullest extent.

The lowered panel X, after dropping and then being lowered by the bed, is then arranged to be moved into what is known as a stacker R which is positioned alongside of the lowering bed. The stacker R, which is best illustrated in Figures 1 and 3, comprises a frame member 64 of a width equal to the length of the cut off panel X. The frame carries longitudinally extending upper and lower guide rails 65 and 66 which receive between them the panels X. The forward end of these guide rails is flared outwardly so that the panel X can be received freely in between the guide bars. To place the lowered panel X, which has just been cut off, into the stacker, there is provided a push bar 67 which is supported on the ends of U-shaped rods 68, which rods are connected to fluid motors 69. These fluid motors are preferably operated by air under pressure and from any suitable source. When the panel X has been lowered the panel will be in the same plane as the push bar and thus by an actuation of the push bar it will push the cut off panel off the lowering bed and into the stacker. Any suitable valve mechanism may be employed to control the operation of the fluid motors 69. As shown in Figure 9, a control valve 69' is provided and it is connected to be actuated from the lowering bed. The valve will be opened when the panels of the lower bed reach their lowest position where the cut off panel X of the corrugated structure is in the plane of the push bar. The valve remains closed during the lowering of the panels 60 under the action of the carriage. After the panel X is moved off the lowering bed a spring 63' raises the panels 60 to their top position so that they can act as a support for the moving corrugated structure as it comes through the carriage. The spring is strong enough to return the panels 60, but not of such strength as to prevent the weight of panel X from lowering the panels 60 of the lowering bed when it is cut off and allowed to drop on the top edges of panels 60.

If it should be desired to make wider panels than the panels X, then this can be done by adhering the edge of one panel X to that of the previous cut off panel X. Adhesive can be applied to the edge of the corrugated structure as it moves onto the lowering bed. When this panel is cut off and pushed into the stacker it will be adhered to the edge of the previously cut off panel already in the stacker. If there is to be adhering of the panels X together in the stacker, then the covering sheets for the panels can be applied after they come from the stacker instead of applying the covering sheets as the structure comes from the dryer as has been previously described.

Figure 13:
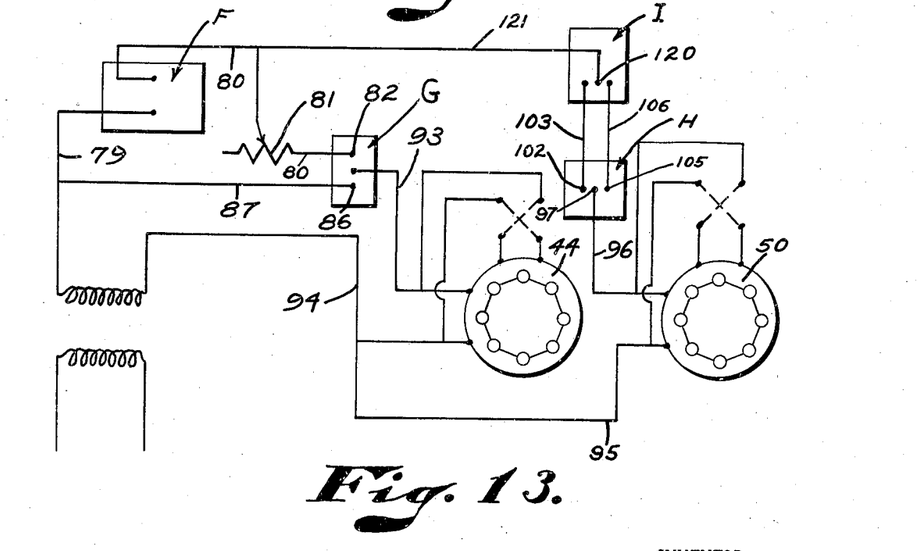
Figure 13 is a diagrammatic view showing the electric circuits and switches employed on the machine.

The wiring circuit for the two motors 44 and 50 and the switches embodied in said circuits is shown diagrammatically in Figure 13. In addition to the switch F, already referred to, the circuits for the motor include a switch G, a switch H and a switch I. The switch G is a single pole, double throw switch and is arranged to control the motor 44 which moves the carriage backward and forward. This switch G is shown schematically in Figure 15 and is mounted to be carried by the carriage and to be controlled by spaced stops 70 and 71 on the support upon which the carriage moves backward and forward. The switches H and I are arranged to control a circuit for the motor 50 which moves the saw back and forth across the moving corrugated structure. The switch H is a snap acting, double throw switch and is mounted on the rear part of the carriage to move therewith and is controlled by a stop 72 upon the carriage support. This switch is shown schematically in Figure 16. The switch I is the same as switch G and is mounted on the motor 47 to be controlled by stops 73 and 74 at opposite ends of the carriage. The switch I is shown schematically in Figure 17.

The switch F, which as previously mentioned, is to be controlled by the end of the corrugated structure (shown schematically in Figure 14), comprises a box 75 attached to bar 56. In this box is mounted a fixed contact 76 and a movable contact 77. The movable contact is adapted to be controlled by a plunger 78 which extends through the bar 56 to be directly in the path of the end of the corrugated structure so that it can be engaged by this end and move the movable contact 77 into engagement with the fixed contact 76 to thus close the switch. When the switch is closed the end of the moving corrugated structure moves the bar and through it the member 55 and the carriage. One contact, namely, the fixed contact 76, is connected to the source of electrical energy by means of a conductor 79 and the movable contact is connected by a conductor 80 through a rheostat 81 to a terminal 82 of the switch G.

Figures 14, 15, 16, 17:
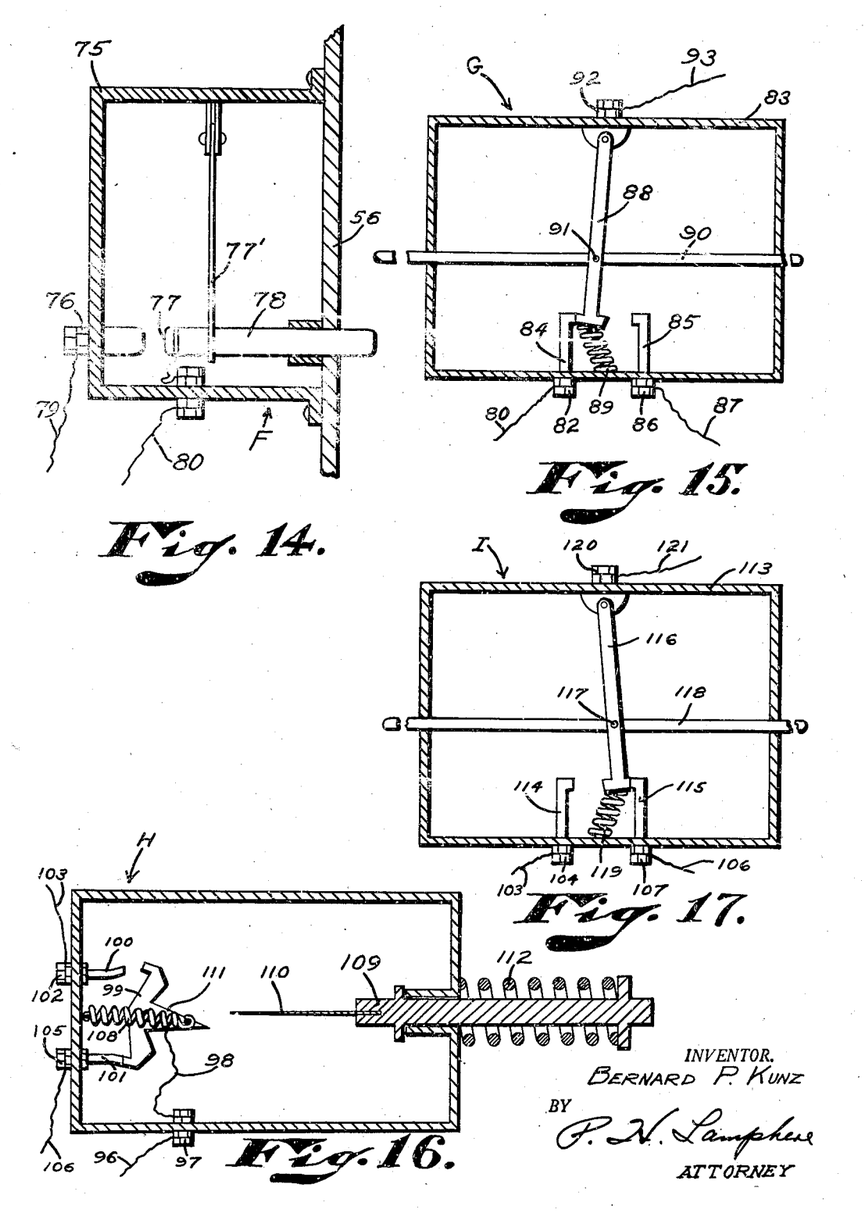
Figures 14, 15, 16 and 17 are sectional views through the switch boxes showing details of the four switches employed in the electrical circuits.

The switch G, as shown in Figure 15, comprises a box 83 in which the previously mentioned terminal 82 is mounted. This terminal 82 is part of a fixed contact 84 which is spaced from another fixed contact 85, the terminal 86 of which is connected by a conductor 87 to the previously referred to conductor 79 which leads from the source of power to the switch F. Within the switch box is a pivoted contact member 88 for alternate engagement with the fixed contacts 84 and 85. A spring 89 acts on this movable contact to hold it in engagement with either fixed contact that it may be moved to engage. The movable contact is actuated by a rod 90 which extends through the switch box and projects from opposite ends thereof, said rod being pivoted to the movable contact by an insulated pin 91. With this arrangement it is seen that if the rod 90 is moved longitudinally to the left, as viewed in Figure 15, the movable contact 88 will be placed in engagement with the fixed contact 84, and if the rod is moved in the opposite direction the movable contact will be placed in engagement with the fixed contact 85. The movable contact is connected to a terminal 92 carried by the switch box and leading from this terminal is a conductor 93 which is connected to the single phase reversible motor 44. In order to complete the circuit for the motor 44 a conductor 94 leads therefrom to the source of current.

By noting the circuits for the motor 44 from the wiring diagram, it is seen that when the movable contact 88 of the switch G is in fixed contact with the fixed contact 84 and the switch F is closed, an energized circuit is established for the motor through the rheostat 81 so that this motor can be driven slowly in one direction. When either the switch F or the contacts 85 and 88 are open the motor 44 will be de-energized. Immediately upon breaking of the contacts 88 and 84 the contacts 88 and 85 will be closed, thus establishing a circuit for the motor directly from the source of power and also causing this motor to reverse its direction of rotation, consequently causing the carriage which is driven by the motor to be moved in the opposite direction. When the circuit including the rheostat is established, the carriage will be driven forwardly and the motor 44 will act as an assisting motor to help move the corrugated structure during the cross-cutting of the saw. When the other circuit is established for the motor, the motor will have a higher speed in the reverse direction and this will cause the carriage to move rearwardly quite rapidly so that the saw will be in a new position to move forwardly with the moving corrugated structure and perform another cross-cutting operation.

The motor 50 which controls the movement of the saw and its motor 47 crosswise of the corrugated structure to accomplish the cross-cutting operation is also a single phase reversible motor and it has in its control circuits the switches H and I. One lead from the motor is connected by a conductor 95 with the source of electrical energy. The other lead comprising a conductor 96 is connected to a terminal 97 carried by the box of the switch H, shown in Figure 16, this switch being of the snap action type. The terminal 97 is electrically connected by a conductor 98 to a double throw switch arm 99. One end of this switch arm is adapted to engage a fixed contact 100 and the other end of the switch arm is adapted to engage a fixed contact 101. The contact 100 is provided with a terminal 102 and connected to this terminal is a conductor 103 which is connected to a fixed terminal 104 of switch I. The other fixed contact 101 of switch H has a terminal 105 and a conductor 106 leads from this terminal to a terminal 107 of switch I. Associated with the double throw switch arm of switch H is an over-center spring 108 to thus hold the arm contacted with either fixed contact 100 or 101 it may be caused to engage. The double arm is arranged to be actuated by a plunger 109 slidably mounted in the end of the switch box opposite the end which carries the fixed contacts. This plunger has a leaf spring finger 110 for actuating the double arm element. Associated with the double arm is a V-shaped guide 111 for guiding the finger into engagement with the arm on opposite sides of its pivot. If the arm is positioned to engage the fixed contact 100, then the apex of the V-shaped member will be so positioned that the spring finger will be guided to engage the arm on a side of the pivot so as to actuate said arm and cause its disengagement from the fixed contact 100 and its engagement with the fixed contact 101. This will then throw the apex of the V-shaped member on the opposite side of the line of movement of the plunger and the spring finger so that a subsequent reciprocation of the plunger will move the double switch arm so as to disengage it from contact 101 and cause its engagement with the contact 100. The plunger 109 extends out of the casing and associated therewith is a spring 112 for normally withdrawing the plunger after it has moved forwardly to actuate the arm.

Figure 10:
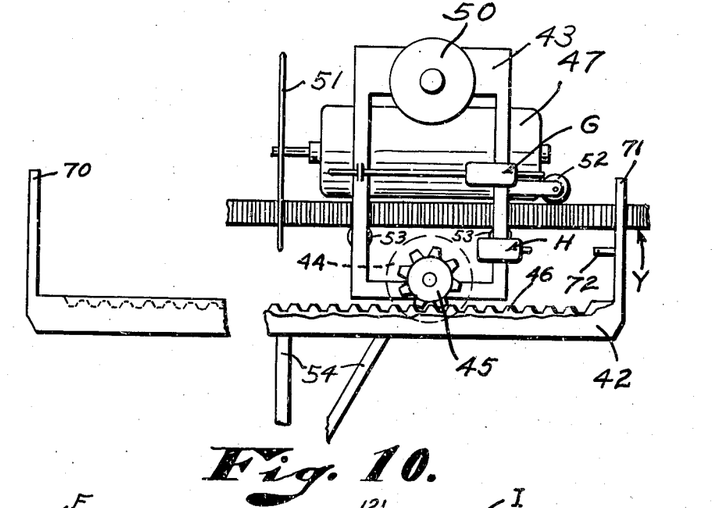
Figure 10 is an enlarged side view of the saw carriage and support showing details.
Figure 11:
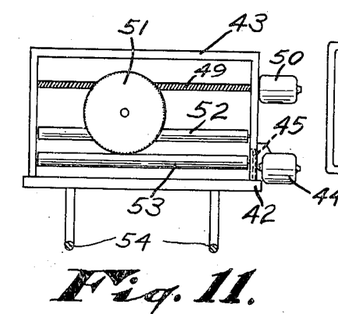
Figure 11 is a view of the front of the saw structure as viewed from the line 11—11 of Figure 9.
Figure 12:
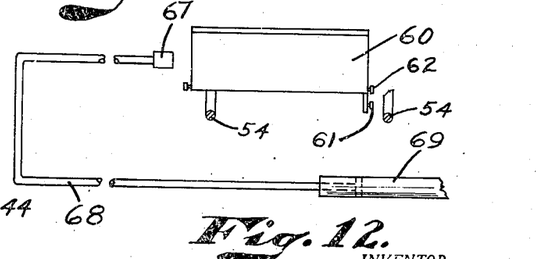

The switch H is mounted on the rear part of the carriage as is best seen in Figure 10 and the plunger is arranged to be actuated by the previously referred to stop 72 on the support. Thus it is seen that each time the carriage is returned to the rear end of its support by the motor 44, the switch H will be actuated.

The switch I, which is shown schematically in Figure 17, is substantially the same as the previously described switch G and is mounted to move with the carriage and is controlled by the previously referred to stops 73 and 74 mounted on the ends of the carriage. The switch I has a box 113 and the two spaced contacts 114 and 115 thereof are provided with the previously mentioned terminals 104 and 107 to which the conductors 103 and 106 coming from the switch H are connected. The switch I has a movable contact 116 and this contact is connected by an insulated pin 117 to the reciprocable actuating rod 118 extending through the switch box. A spring 119 acts to hold the movable contact member into engagement with whichever fixed contact, 114 or 115, it is moved to engage. When the saw and motor moves to the far side, as viewed from the bottom of Figure 8, and the stop 73 is engaged by the rod 118, the movable contact member 116 will be disengaged from the fixed contact 114 and engaged with the fixed contact 115. When the carriage moves back to the near side the rod 118 will engage the stop 74, thus causing the movable contact 116 to be moved away from the fixed contact 115 and into engagement with the contact 114. The movable contact 116 is electrically connected to terminal 120 and a conductor 121 leads therefrom and is connected to the conductor 80 coming from the switch F as is apparent from viewing the wiring diagram of Figure 13.

With the switches H and I in the motor circuit 50, the said motor will move the saw and its motor alternately (depending on which parallel circuit is closed) across the moving corrugated structure as the carriage moves with the corrugated structure and thus cut off the panels X. When the saw and its motor reaches the far side of the carriage the stop 73 will be engaged so that the switch I will be actuated to break the circuit on the motor 50 and stop the movement of the screw. This circuit will remain broken until the switch H is actuated when the carriage reaches the rear end of the support, at which time the double arm contact member of switch H will be reversed so as to establish a new circuit for the motor 50 through the previously made contact in switch I to cause it to rotate in the opposite direction. This will turn the screw in the opposite direction and bring the saw and its motor back across the carriage to make a new cut as the corrugated structure moves forwardly and the carriage moves therewith by the operation of motor 44.

Referring to the operation of the corrugated structure making machine just described in detail and the steps and method carried out by said machine, a wide strip of corrugated paper having a corrugated sheet and a single flat surface sheet adhered together will be continuously fed into the machine either from a roll or directly from a corrugating machine with the strip having its corrugated side facing downward. This strip will be cut into the narrower strips 7 and the crowns on the exposed corrugated side of each strip 7 will have adhesive applied thereto as the strips pass over the adhesive roller 9. From here the strips 7 will move through the guide assembly A where said strips will be caused to be turned through an angle of substantially 90 degrees and thus placed on edge. As the strips pass through the guide assembly they will also have their direction of movement changed in such a manner that the strips will be closely adjacent each other so as to be ready to pass through the press P where the corrugated structure Y is formed. As the strips are adhered together in the press the press will also cause corresponding edges of the strips to be placed in the same plane. After coming from the press the continuously moving corrugated structure Y will pass through the drying and dehydrating unit D, after which paper sheets are applied to the opposite major surfaces of the corrugated structure if it is desired to have paper applied at this point. Following the application of the paper facing sheets to the corrugated structure, if such is done, then the corrugated structure will move through the saw carriage, it being first assumed that the carriage is at the rear end of the support, that is, at the end toward the direction from which the corrugated structure is moved. After the corrugated structure moves through the saw carriage it will move out onto the lowering bed and be supported by the top ends of the pivoted panels 60. When the end of the corrugated structure reaches and engages the bar 56 it will close switch F and transfer a force through the arms 54 and thereby cause a movement of the carriage. When the switch F is closed, a circuit will be established through the motor 44 which will include the rheostat 81 and thus the motor will begin to operate at a slow speed to assist in moving the carriage. The circuit including the rheostat will be established when the switch F is closed, due to the fact that the movable contact 88 of switch G engages the fixed contact 84 of said switch as a result of the engagement of the actuating rod 90 with the stop 71 when the carriage reached the rear end of its support which has been assumed as the starting point.

As the carriage moves with the moving corrugated structure the saw and its motor 47 will begin to be moved transversely across the carriage to make the cross cut through the moving corrugated structure to thereby produce the panel X. No circuit is shown for the saw motor 47, it being assumed that this motor is to be constantly operating. In considering the movement of the saw across the carriage, it can be assumed that it is on the near side of the carriage as said carriage is viewed in Figure 8. The cross feed motor 50 will begin to operate as soon as the switch F is closed. Closing of switch F will also cause the operation of the motor 44 to assist in moving the carriage since the switch F also controls the circuit for the motor 44. As soon as motor 50 begins to operate it will turn the screw 49 and thus the saw motor 47 will be moved from the near side of the carriage to the far side of the carriage, as viewed in Figure 8, and there will be a cross cutting of the moving corrugated structure and the line of cut will be at right angles to the longitudinal axis of the moving corrugated structure. When the corrugated structure has been cut crosswise the motor 50 will be stopped, this being caused by the switch I being actuated by the stop 73 on the far end of the carriage. Actuation of this switch I will open the circuit to the motor 50 by disengaging the movable contact 116 from the fixed contact 114 and engaging the said movable contact with the fixed contact 115 in a parallel circuit. The moving corrugated structure will be cut crosswise before the carriage reaches the forward end of its support.

As soon as the carriage approaches the forward end of its limit of travel on the support, the pivoted panels 60 of the lowering bed will be actuated by the carriage movement and these panels moved downwardly a limited extent away from the corrugated structure from which panel X has been cut off. When the carriage reaches its forward point of travel the stop 70 will be engaged by the actuating rod of switch G and this will result in the movable contact 88 of said switch being disengaged from the fixed contact 84 and moved over to engage the fixed contact 85. Consequently the circuit of motor 44 will be reversed and this motor will return the carriage. Simultaneously with the actuation of the switch G by the stop 70, the stop 59 will be so engaged as to trip the trigger 58 and allow the bar 56 which is being pushed by the end of the corrugated structure to swing in a direction away from the said end. This will free the panel X which has been cut off and it will drop onto the pivoted panels of the lowering bed and due to its weight these panels will be forced to swing downwardly to lower the panel X into the plane of the push bar 67. When the plane of the push bar is reached by the panel X the control valve 69' will be controlled in such a manner that the fluid motors 69 are operated. The operation of these fluid motors will cause movement of the push bar 67 and the cut off panel X will then be slid into the stacker. As soon as the panel is moved off the lowering bed the spring 63' will then raise the pivoted panels 60 of the lowering bed up to a position where they can again support the moving corrugated structure coming through the saw carriage. The raising of the panels 60 of the lowering bed will so control the valve 69' that the push bar 67 will be returned to a position where it is ready to push the next cut off panel X into the stacker at the proper time.

During the time that the cut off panel X is lowered and being pushed into the stacker, the carriage will be moved to the rear end of its support by the operation of the motor 44, said motor operating in a reverse direction to that when it is assisting the forward movement of the carriage with the moving corrugated structure. This reversing of the motor 44 takes place when the switch G is actuated by the engagement of its actuating rod with the stop 70, causing movement of the movable contact 88 into engagement with the fixed contact 85. When the circuit is established by the closing of contacts 88 and 85, which does not include the rheostat, the motor 44 will have a fairly high rate of speed and thus the carriage will be moved quickly rearwardly carrying with it the arms 54 and the bar 56 which are to be engaged by the end of the moving corrugated structure. When the trigger 58 is moved away from the stop 59 the leaf spring 58' will be effective to reset the trigger so that the bar 56 is locked and can again properly transfer movement of the corrugated structure to the carriage.

As the corrugated structure moves over the panels of the lowering bed, its end will again engage the bar 56 and cause a closing of the switch F. When this switch is closed the motor 44 will be reversed and it will again act to assist the movement of the carriage with the corrugated structure. The closing of the switch F also results in establishment of a circuit to the cross feed motor 50 which will cause this motor to be driven reversely to that which it was previously driven. Consequently the rotation of screw 49 will be reversed and the motor 47 and the saw will be moved back across the carriage from the far side to the near side, as viewed from the bottom of Figure 8, thus again cutting off another panel X. The closing of the switch F will result in establishing a circuit to the motor 59 causing the motor to rotate in its reverse direction due to the operation of the switch H. It will be noted that when the carriage has been moved to the rear of the carriage support the snap acting switch H will be operated and a new circuit established which will include the contacts 88 and 84 of switch G, already having been caused to close by the actuation of the switch due to the actuating rod 90 engaging the stop 71 at the rear end of the travel of the carriage. As the carriage moves forwardly with the corrugated structure a new panel X will be cut off and this panel will be caused to drop below the moving structure when the carriage reaches the forward end of its travel in a manner already described. After the panel drops out of the line of movement of the corrugated structure it will be lowered and then pushed into the stacker. When the panel X drops, the carriage movement will be reversed so that it will move back again to the rear end of its support in order that when the end of the moving structure again closes switch F it will be ready to move forwardly with the moving structure and the motor 50 will then again move the saw back across the carriage so as to produce another cross cut. The entire operation is entirely automatic and the movement of the carriage and the saw takes place at proper times so that during sawing the carriage will always be moved forwardly with the corrugated structure at the time that the saw is moved across the corrugated structure to produce the cross cut and the finished panel.

Being aware of the possibilities of modifications in the particular method and apparatus disclosed as embodying my invention without departure from the fundamental principles of said invention, I do not desire that the scope of the invention be limited in any manner except as set forth by the appended claims.

What is claimed is:

1. A machine for converting a sheet of corrugated paper having a facing sheet on one side into a corrugated structure panel in which the axes of the corrugations are at right angles to the major surfaces of said structure, said machine comprising a cutter having a plurality of equally spaced cutter elements for cutting the sheet longitudinally to form a plurality of strips as the sheet passes therethrough, means for applying adhesive to the exposed crowns of the corrugations of the strips, guide means engaging only the faced side of each strip for turning the strips in like direction through an angle of ninety degrees, means for bringing the strips into adhering relation and like edge faces into a single plane, and means for cutting the resulting structure transversely of its longitudinal edges as the structure continues to move.

2. A machine for converting a sheet of corrugated paper having adhered to one surface a flat sheet of material into a corrugated structure in which the axes of the corrugations are at right angles to the major surfaces of said structure, said machine comprising a cutter having a plurality of equally spaced cutter elements for cutting the sheet longitudinally to form a plurality of strips as the sheet passes therethrough, means for applying adhesive to exposed crowns of the corrugations of the strips, an upstanding guide engaged by the flat surface only of each strip for turning each strip on edge, means including said guides for changing the direction of movement of the strips to be at right angles to their movement after leaving the cutter, said guides being so arranged that the on-edge strips leaving the guides will be in juxtaposition, means for bringing the strips into adhering relation and like edge faces into a single plane.

3. A machine for converting a sheet of corrugated paper having adhered to one surface a flat sheet of material into a corrugated structure in which the axes of the corrugations are at right angles to the major surfaces of said structure, said machine comprising a cutter having a plurality of equally spaced cutter elements for cutting the sheet longitudinally to form a plurality of strips as the sheet passes therethrough, an adhesive roller for applying adhesive to the strips on one surface, an upstanding guide for turning each strip on edge, means including said guides for changing the direction of movement of the strips to be at right angles to their movement after leaving the cutter, said guides being so arranged that the on-edge strips leaving the guides will be in juxtaposition, means for bringing the strips into adhering relation and like edge faces into a single plane, a dryer, and means for passing the adhered strips through the dryer, said dryer having a current of heated air moving in such a direction that said air will pass through the spaces formed by the corrugations of the adhered together strips.

4. In a machine of the class described, a cutter having a plurality of equally spaced cutting elements for cutting a moving sheet of material into strips, means for driving the cutter, means for moving said strips forwardly from the cutter and applying adhesive to one surface of the strips, means for reorienting the strips and changing their direction of movement including a plurality of guides so positioned that each strip will be turned bodily through an angle of 90 degrees by engaging a guide only by its surface opposite the surface to which adhesive is applied and so arranged with respect to each other that when the strips pass over the guides and move in like directions at substantially right angles to their movement in coming to the guides said strips will be in close side by side relation, and a press for causing adjacent surfaces of the strips to become engaged and adhered together and corresponding edges to be in the same plane.

5. In a machine of the class described, a cutter having a plurality of equally spaced cutting elements for cutting a moving sheet of material into strips, means for driving the cutter, means for moving said strips forwardly from the cutter and applying adhesive to one surface of the strips, a guide for each strip having a curved guiding surface positioned at right angles to the major surface of the sheet as it passes the cutter and engage only by that surface of the sheet which is opposite to the surface having the adhesive, said guides being arranged in line and the line being so positioned at an angle to the path of movement of the strips coming to the guides that the strips when moved from the guides at substantially right angles to said path of movement to the guides will be in close side by side relation, and means for causing the adjacent surfaces of the strips to have adhering engagement and corresponding edges of the strips to be in the same plane.

6. In a machine for converting a sheet of corrugated paper having adhered to one of its corrugated surfaces a sheet of material into a corrugated structure in which the axes of the corrugations are at right angles to the major surfaces of said structure, said machine comprising a cutter means for cutting the sheet longitudinally to form a plurality of strips as the sheet passes therethrough, means for applying adhesive material to the exposed crowns only of each strip, and a guide means for turning in like directions each strip on edge and for changing the direction of movement of each strip, each strip engaging its guide means only by the flat surface of the strip during the turning on edge and changing of direction of movement and each strip having such like change in direction as to bring the strips into adjacent contacting positions so that the exposed crowns of one strip will be adhered to a flat surface of an adjacent strip.

7. In a machine for converting a sheet of corrugated paper having adhered to one of its corrugated surfaces a sheet of material into a corrugated structure in which the axes of the corrugations are at right angles to the major surfaces of said structure, said machine comprising a cutter means for cutting the sheet longitudinally to form a plurality of strips as the sheet passes therethrough, means for applying adhesive material to the exposed crowns only of each strip, a guide means for turning in like directions each strip on edge and for changing the direction of movement of each strip, each strip engaging its guide means only by the flat surface of the strip during the turning on edge and changing of direction of movement and each strip having such like change in direction as to bring the strips into adjacent contacting positions so that the exposed crowns of one strip will be adhered to a flat surface of an adjacent strip, and means for applying and adhering a facing sheet of material to the surface of the structure formed by like edges of the adhered together strips.

8. In a machine for converting a sheet of corrugated paper having adhered to one of its corrugated surfaces a sheet of material into a corrugated structure in which the axes of the corrugations are at right angles to the major surfaces of said structure, said machine comprising a cutter means for cutting the sheet longitudinally to form a plurality of strips as the sheet passes therethrough, means for applying adhesive material to the exposed crowns only of each strip, guide means for turning the strips in like directions to place such on edge, said guide means being so arranged that the turning of the strips will take place in a space not greater than the width of the sheet of corrugated paper, and means for moving the strips in like directions away from the guide means into adhered together relation with the crowns of the strips being adhered to flat surfaces of adjacent strips, said strips in passing over the guide means and changing their direction of movement having working pressure on the guides only by means of the facing sheet portion of each strip.

9. In a machine for converting a sheet of corrugated paper having adhered to one of its corrugated surfaces a sheet of material into a corrugated structure in which the axes of the corrugations are at right angles to the major surfaces of said structure, said machine comprising a cutter means for cutting the sheet longitudinally to form a plurality of strips as the sheet passes therethrough, means for applying adhesive material to the exposed crowns only of each strip, and guide means acting on the flat side surfaces of each strip for turning the strips on edge and changing their direction of movement in such manner that the exposed crowns of one strip will engage and be adhered to the flat surface of an adjacent strip, said guide means being so arranged that the exposed crowns of the corrugations of each strip in moving from the cutting means to the end of the guide means will not engage wtih an adjacent strip or with the guide means.

10. A method of continuously making a corrugated structure from a corrugated sheet structure comprising a sheet of corrugated paper or like material having the axes of its corrugations parallel to each other and at right angles to the longitudinal edges of the sheet and being provided with a flat sheet of material adhered to the crowns of the corrugations on one side, said method comprising moving the sheet longitudinally and simultaneously providing the corrugated sheet structure with longitudinal equally spaced parallel slits to form a plurality of strips, simultaneously placing adhesive on the exposed crowns of the corrugations of the strips while moving, turning the strips in like directions while moving and in a space having a width not greater than the width of the corrugated sheet structure to thereby place the strips on edge, and then moving said edge positioned strips into adhering engagement and maintaining corresponding edges in a single plane.

11. A method of continuously making a corrugated structure from a corrugated sheet structure comprising a sheet of corrugated paper or like material having the axes of its corrugations parallel to each other and at right angles to the longitudinal edges of the sheet and being provided with a flat sheet of material adhered to the crowns of the corrugations on one side, said method comprising moving the sheet longitudinally and simultaneously providing the corrugated sheet structure with longitudinal equally spaced parallel slits to form a plurality of strips, simultaneously placing adhesive on the exposed crowns of the corrugations of the strips while moving, turning the strips in like directions while moving to thereby place the strips on edge, moving said edge positioned strips into adhering engagement while maintaining corresponding edges in a single plane, and then adhering a facing sheet to at least one major surface formed by the edges of the strips.

12. A method of continuously making a corrugated structure from a corrugated sheet structure comprising a sheet of corrugated paper or like material having the axes of its corrugations parallel to each other and at right angles to the longitudinal edges of the sheet and being provided with a flat sheet of material adhered to the crowns of the corrugations on one side, said method comprising moving the sheet longitudinally and simultaneously providing the corrugated sheet structure with longitudinal equally spaced parallel slits to form a plurality of strips, simultaneously placing adhesive on the exposed crowns of the corrugations of the strips while moving, turning the strips in like directions while moving to thereby place the strips on edge, and then guiding said edge positioned strips while moving and by contact with the smooth surface only of each strip so that the strips assume adhering engagement with exposed crowns of a strip being adhered to a smooth surface of an adjacent strip and with all corresponding edges of the strips in a single plane.

13. A method of continuously making a corrugated structure from a corrugated sheet structure comprising a sheet of corrugated paper or like material having the axes of its corrugations parallel to each other and at right angles to the longitudinal edges of the sheet and being provided with a flat sheet of material adhered to the crowns of the corrugations on one side, said method comprising moving the sheet longitudinally and simultaneously providing the corrugated sheet structure with longitudinal equally spaced parallel slits to form a plurality of strips, simultaneously placing adhesive on the exposed crowns of the corrugations of the strips while moving, turning the strips in like directions while moving and in a space having a width not greater than the width of the corrugated sheet structure to thereby place the strips on edge, moving said edge positioned strips into adhering engagement and simultaneously maintaining corresponding edges in a single plane, and then passing the adhered together structure through a dryer having a heated current of air moving in such direction as to pass through the openings in the structure formed by corrugations.

14. A method of continuously making corrugated structure panels from a corrugated sheet structure comprising a sheet of corrugated paper or like material having the axes of its corrugations parallel to each other and at right angles to the longitudinal edges of the sheet and being provided with a flat sheet of material adhered to the crowns of the corrugations on one side, said method comprising moving the sheet longitudinally and simultaneously providing the sheet structure with longitudinal equally spaced parallel slits to form a plurality of strips, simultaneously placing adhesive on the exposed crowns of the corrugations of the strips while moving, turning the strips in like directions while moving to thereby place the strips on edge, then moving said edge positioned strips into adhering engagement and maintaining corresponding edges in a single plane, and then sawing equal length panels from the resulting adhered together structure while it continues to move.

15. A method of continuously making corrugated structure having the axes of the corrugations at right angles to the major surfaces of the structure from a sheet of corrugated paper or like material having its corrugations parallel to each other and at right angles to the longitudinal edges of the sheet, said method comprising moving the sheet longitudinally and simultaneously providing the sheet with longitudinal equally spaced slits to form a plurality of strips, simultaneously placing adhesive on the exposed crowns of the strips while moving, turning the strips in like directions while moving to place the strips on edge, moving said strips longitudinally and into adhering engagement, maintaining corresponding edges of the strips in a single plane during the adhering, and adhering a facing sheet to at least one major surface of the structure formed by edges of the strips.

16. The method of continuously making corrugated structure panels from a corrugated sheet structure comprising a sheet of moving corrugated paper or like material having corrugations extending at right angles to its longitudinal edges and being provided with a facing sheet, said method comprising slitting the sheet structure longitudinally to produce strips of equal width while said sheet is moving in a longitudinal direction, continuously placing adhesive on the exposed crowns of the strips, turning the strips through an angle of ninety degrees so as to place them on edge, then moving all the strips in a like different direction to place adjacent surfaces in engagement and adhering relation and simultaneously maintaining corresponding edges in a single plane, and then severing the structure crosswise at predetermined distances from its end to thereby form like panels as the adhered together strips continue to move forwardly.

17. The method of making a continuous corrugated structure from a sheet of corrugated paper the corrugations of which extend crosswise of the sheet and said corrugations having secured to the crowns on one side a flat sheet of paper, said method comprising slitting the sheet of paper longitudinally into strips of like width, applying adhesive to the crowns of the corrugated surface only of each strip, turning said strips on edge so that each corrugated surface is adjacent a smooth surface of an adjacent strip, and then bringing the strips into adhered relation by guiding the strips in like lateral direction from their movement during turning and simultaneously maintaining like edge of each strip in a single plane.

18. The method of making a panel from a sheet of corrugated paper the corrugations of which extend crosswise of the sheet and said corrugations having secured to the crowns on one side a flat sheet of paper, said method comprising slitting the sheet of paper longitudinally into strips of like width, applying adhesive to the exposed crowns only of the corrugated surface of each strip, turning said strips on edge so that each adhesive surface is adjacent a non-adhesive surface of an adjacent strip, bringing the strips into adhered relation and simultaneously maintaining like edge of each strip in a single plane, passing the adhered strips through a drying chamber, and then cutting the strips crosswise to form a rectangular panel.

19. A method of making a corrugated structure from a sheet of corrugated material having the axes of its corrugations parallel to each other and at right angles to the longitudinal edges of the sheet and being provided with a flat sheet adhered to the surface of the crowns of the corrugations on one major side, said method comprising slitting the two adhered sheets longitudinally by moving them through a saw to provide strips of like width, applying an adhesive to the exposed crowns of the strips, simultaneously so guiding and moving said strips in a different direction as to place them on edge with the adhesive surface of each strip in juxtaposition with a non-adhesive surface of an adjacent strip, and then bringing the juxtapositioned surfaces into securing relation and simultaneously maintaining the corresponding edges of the strips in a single plane to thus produce a corrugated structure in which the axes of the corrugations are at right angles to the surfaces defined by the edges of the strips.

BERNARD P. KUNZ.

REFERENCES CITED

The following references are of record in the file of this patent:

UNITED STATES PATENTS

| Number | Name | Date |
|---|---|---|
| 1,107,906 | Crumbaugh | Aug. 18, 1914 |
| 1,538,086 | Buttress | May 19, 1925 |
| 1,787,404 | Taylor et al. | July 9, 1926 |
| 1,754,784 | Borsodo | Apr. 15, 1930 |
| 1,852,451 | Everett | Apr. 5, 1932 |
| 2,159,282 | Marino | May 23, 1939 |
| 2,373,500 | Pearce | Apr. 10, 1945 |
| 2,402,631 | Hull | June 25, 1946 |